US011991794B2

(12) United States Patent
Liu

(10) Patent No.: US 11,991,794 B2
(45) Date of Patent: May 21, 2024

(54) CERAMIC HEATING ELEMENT AND ELECTRONIC CIGARETTE

(71) Applicant: Shenzhen Buddy Technology Development Co., Ltd., Shenzhen (CN)

(72) Inventor: Xiang Liu, Shenzhen (CN)

(73) Assignee: Shenzhen Buddy Technology Development Co., Ltd., Shenzhen (CN)

( * ) Notice: Subject to any disclaimer, the term of this patent is extended or adjusted under 35 U.S.C. 154(b) by 602 days.

(21) Appl. No.: 17/272,265

(22) PCT Filed: Feb. 2, 2019

(86) PCT No.: PCT/CN2019/074556
§ 371 (c)(1),
(2) Date: Feb. 26, 2021

(87) PCT Pub. No.: WO2020/057046
PCT Pub. Date: Mar. 26, 2020

(65) Prior Publication Data
US 2021/0274600 A1 Sep. 2, 2021

(30) Foreign Application Priority Data
Sep. 21, 2018 (CN) ......................... 201821576357.4

(51) Int. Cl.
*H05B 3/14* (2006.01)
*A24F 40/46* (2020.01)
*A24F 40/57* (2020.01)

(52) U.S. Cl.
CPC ............. *H05B 3/141* (2013.01); *A24F 40/46* (2020.01); *A24F 40/57* (2020.01)

(58) Field of Classification Search
None
See application file for complete search history.

(56) References Cited

U.S. PATENT DOCUMENTS 6,084,220 A * 7/2000 Suematsu .............. H05B 3/283 219/544
6,125,853 A 10/2000 Susa et al.
(Continued)

FOREIGN PATENT DOCUMENTS

CN 203087526 U 7/2013
CN 203467679 U 3/2014
(Continued)

OTHER PUBLICATIONS

International Search Report and Written Opinion of the International Searching Authority issued by the China National Intellectual Property Administration for corresponding International Patent Application No. PCT/CN2019/074556, mailed on Apr. 16, 2019, with an English translation.
(Continued)

*Primary Examiner* — Oscar C Jimenez
(74) *Attorney, Agent, or Firm* — MYERS WOLIN, LLC

(57) ABSTRACT

A ceramic heating element is disclosed, including: a flat or needle-shaped ceramic housing, a support bracket sleeved in the ceramic housing, and a heating wire evenly wound on the support bracket. An interior of the support bracket is a hollow structure. An electronic cigarette is further disclosed, including the ceramic heating element.

16 Claims, 5 Drawing Sheets

(56) References Cited

U.S. PATENT DOCUMENTS

| | | | | |
|---|---|---|---|---|
| 7,982,166 | B2 * | 7/2011 | Kukino | H05B 3/265 219/541 |
| 8,191,555 | B2 | 6/2012 | Herbrich et al. | |
| 10,779,571 | B2 | 9/2020 | Holoubek et al. | |
| 11,517,049 | B2 * | 12/2022 | Liu | H05B 3/06 |
| 2016/0270449 | A1 * | 9/2016 | Hon | H05B 3/03 |
| 2017/0049156 | A1 | 2/2017 | Wang et al. | |
| 2017/0325510 | A1 * | 11/2017 | Hu | A24F 40/50 |
| 2021/0084980 | A1 * | 3/2021 | Lee | A24F 40/465 |
| 2022/0030943 | A1 * | 2/2022 | Guo | A24F 40/485 |
| 2022/0175045 | A1 * | 6/2022 | Jiang | H05B 3/04 |
| 2023/0130948 | A1 * | 4/2023 | Yan | H05B 1/0291 131/329 |

FOREIGN PATENT DOCUMENTS

| | | | |
|---|---|---|---|
| CN | 203492781 | U | 3/2014 |
| CN | 203563691 | U | 4/2014 |
| CN | 104799438 | A | 7/2015 |
| CN | 204837995 | U | 12/2015 |
| CN | 205624474 | U | 10/2016 |
| CN | 205624481 | U | 10/2016 |
| CN | 205624483 | U | 10/2016 |
| CN | 206390298 | U | 8/2017 |
| CN | 107252139 | A | 10/2017 |
| CN | 108307551 | A | 7/2018 |
| CN | 207803449 | U | 9/2018 |
| JP | H05-240028 | A | 9/1993 |
| JP | 3413208 | B2 | 3/2003 |
| JP | 2008-523934 | A | 7/2008 |
| JP | 2017-225357 | A | 12/2017 |
| JP | 2018-504130 | A | 2/2018 |
| JP | 3217131 | U | 6/2018 |
| KR | 10-2018-0085347 | A | 7/2018 |
| KR | 10-2018-0085646 | A | 7/2018 |
| WO | 2018/135888 | A1 | 7/2018 |

OTHER PUBLICATIONS

Extended European Search Report with Supplementary European Search Report and the European Search Opinion, issued by the European Patent Office for European Patent Application No. 19862791.1, mailed on Jun. 30, 2022.

Notice of Reasons for Refusal issued by the Japan Patent Office for Japanese Patent Application No. 2021-512483, mailed on Apr. 26, 2022, with an English translation.

Search Report by Registered Search Organization issued by the Industrial Property Cooperation Center issued for Japanese Patent Application No. 2021-512483, dated Apr. 18, 2022, with an English translation.

Request for the Submission of an Opinion issued by the Korean Patent Office for Korean Patent Application No. 9-5-2022-080557498, dated Oct. 20, 2022, with an English translation.

Request for the Submission of an Opinion issued by the Korean Patent Office for Korean Patent Application No. 9-5-2023-020976522, dated Mar. 2, 2023, with an English translation.

* cited by examiner

CERAMIC HEATING ELEMENT AND ELECTRONIC CIGARETTE

CROSS REFERENCE TO RELATED APPLICATIONS

This application is a national stage filing under 35 U.S.C. § 371 of international application number PCT/CN2019/074556, filed Feb. 2, 2019, which claims priority to Chinese patent application No. 201821576357.4, filed Sep. 21, 2018, the contents of each of which are incorporated by reference herein in their entirety.

TECHNICAL FIELD

The present disclosure relates to the technical field of heating elements, and in particular to a ceramic heating element and an electronic cigarette.

BACKGROUND

A heating element is a common component or finished product used for heating. Due to its composition and structure arrangement, an existing heating element heats up unevenly with poor insulation performance during use, has a complex structure and high production costs, and is not easy to use, causing poor quality of a heated product in a minor case or causing personal injury in a severe case. Therefore, a heating element of a new structure is needed to solve the above problems.

SUMMARY

To solve the above-mentioned technical problems, the present disclosure provides a ceramic heating element and an electronic cigarette, so as to solve the problems in the existing technology that a heating element heats up unevenly with poor insulation performance, has a complex structure and high production costs, and is not easy to use.

A technical solution provided by the present disclosure to solve the existing technical problems is a ceramic heating element, including: a flat or needle-shaped ceramic housing, a support bracket sleeved in the ceramic housing, and a heating wire evenly wound on the support bracket. An interior of the support bracket is a hollow structure.

As an improvement of the above solution, one end of the heating wire penetrates through the hollow structure of the support bracket, and the other end of the heating wire is distributed in a spiral shape along an outer wall of the support bracket.

As a further improvement of the above solution, the ceramic heating element is in a hollow cylinder shape or a flat shape, and has an integrally formed structure.

As an improvement of the above solution, an open end of the housing is provided with a rectangular or cylindrical base, and an arc transition structure is arranged at a junction between the base and a main structure of the housing.

As a further improvement of the above solution, the ceramic heating element further includes a temperature control component, and the temperature control component is a K-type thermocouple or a TCR temperature control module.

As an improvement of the above solution, one end of the K-type thermocouple penetrates through the interior of the support bracket, and the other end of the K-type thermocouple extends along an outer wall of the support bracket.

As a further improvement of the above solution, the outer wall of the support bracket is provided with at least one groove extending along a length direction of the support bracket, and the groove is capable of being configured to place the K-type thermocouple and/or the heating wire.

As an improvement of the above solution, the ceramic housing is an integrally formed structure, and is sword-shaped as a whole, an end part of the ceramic housing is provided with a blade tip and/or a peripheral edge of the ceramic housing is provided with a sharp edge.

The present disclosure further provides an electronic cigarette, including any one of the ceramic heating elements described above.

The present disclosure brings the following beneficial technical effects: The arrangement of the flat or needle-shaped ceramic housing, the support bracket sleeved in the ceramic housing, and the heating wire evenly wound on the support bracket forms a heating element that has a simple structure and good insulation performance, heats up evenly, and is easy to use, and forms an electronic cigarette using the heating element.

BRIEF DESCRIPTION OF DRAWINGS

To describe the technical solutions in the embodiments of the present disclosure more clearly, the following briefly describes the accompanying drawings required for describing the embodiments.

DETAILED DESCRIPTION

The following describes the concept, specific structure and technical effects of the present disclosure clearly and comprehensively with reference to embodiments and accompanying drawings, so as to fully understand the objectives, solutions and effects of the present disclosure. It should be noted that the embodiments in this application and features of the embodiments may be mutually combined to derive other embodiments not explicitly described. In addition, the descriptions of up, down, left and right used in the present disclosure are only relative to mutual positional relationships of various components of the present disclosure in the figures.

Embodiment 1

Figure 1:
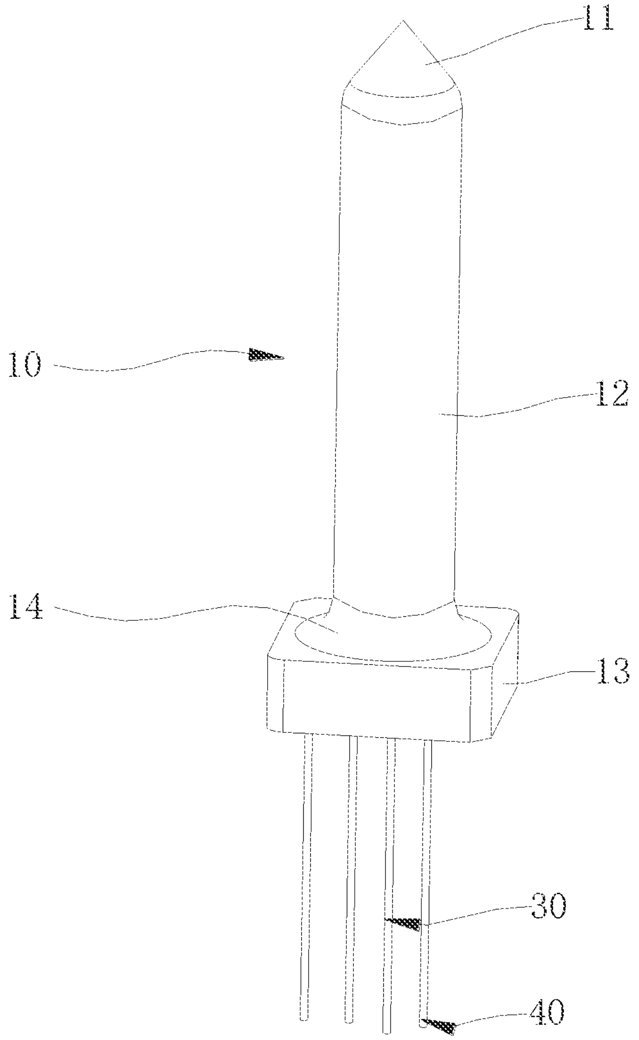
FIG. 1 is a schematic diagram of a heating element according to an implementation of the present disclosure.
Figure 2:
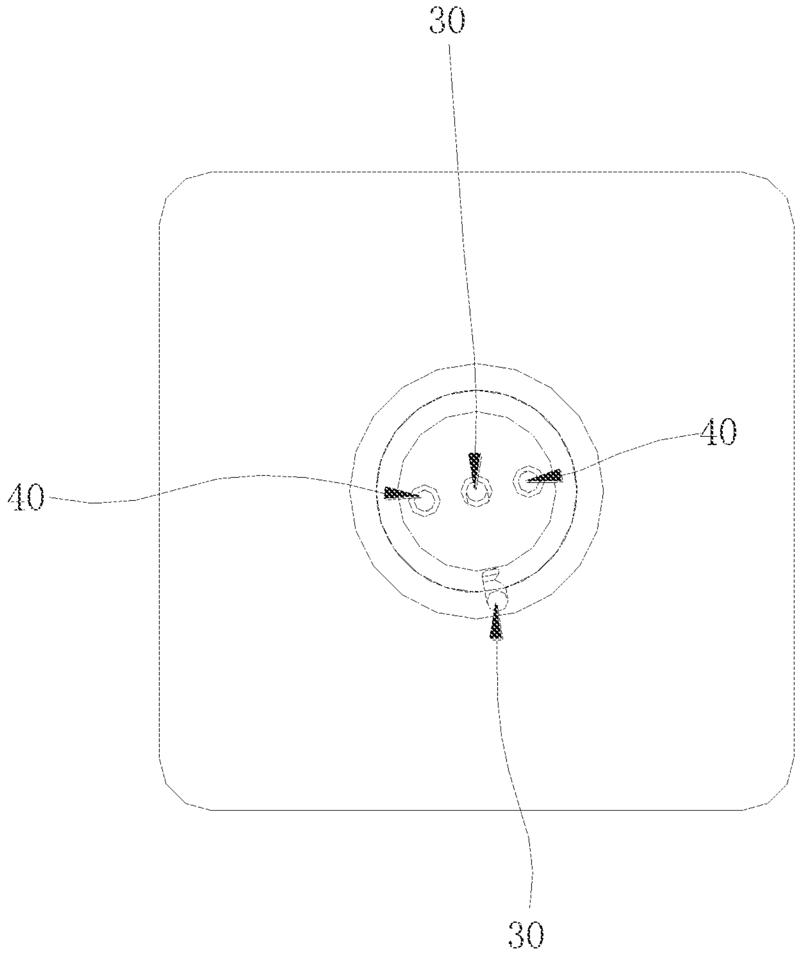
FIG. 2 is a bottom view of the heating element in FIG. 1.
Figure 3:
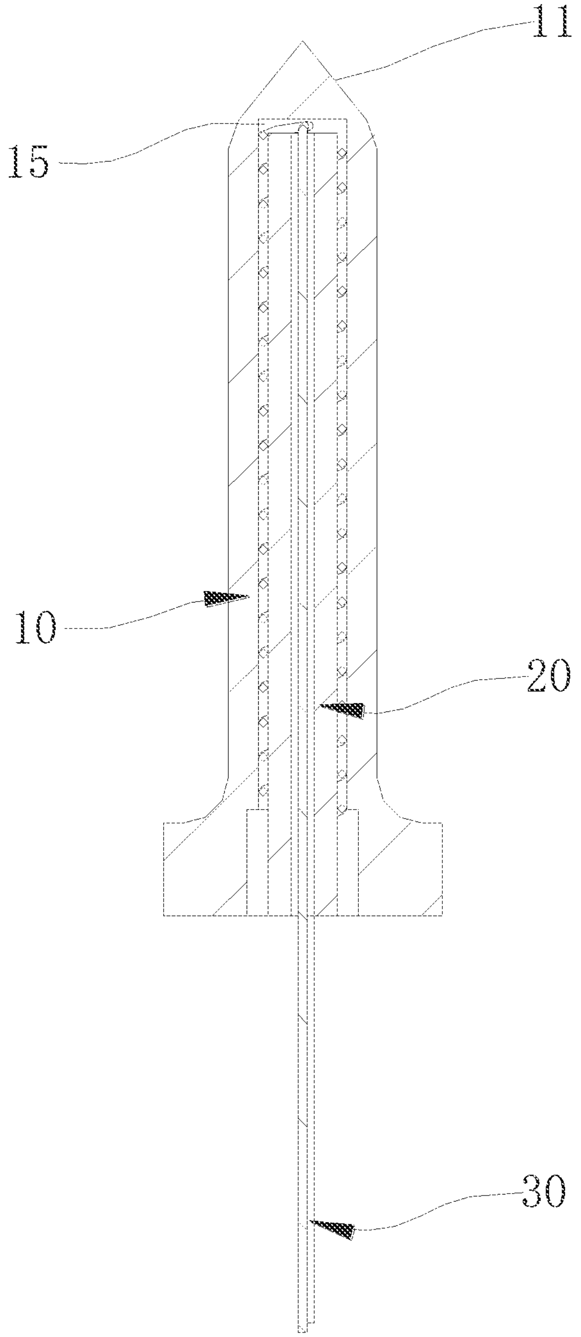
FIG. 3 is a sectional view of a partial structure of the heating element in FIG. 1.

FIG. 1 is a schematic diagram according to an implementation of the present disclosure. FIG. 2 is a bottom view of the heating element in FIG. 1. FIG. 3 is a sectional view of a partial structure of the heating element in FIG. 1. Referring to FIG. 1 to FIG. 3, the ceramic heating element includes a ceramic housing 10 with a needle-shaped three-stage structure, where one end of the ceramic housing is a cone 11, the middle section of the ceramic housing is a cylinder 12, and the other end of the ceramic housing is a cube-shaped base 13; an arc transition structure 14 is arranged at a junction between the cylinder 12 and the base 13 to enhance strength of a main structure of the housing 10. The entire needle-shaped housing 10 facilitates insertion or installation of the heating element into another product that needs to be heated, such as an electronic cigarette stick, to heat the product during use. An accommodation space 15 is arranged inside the housing 10 for accommodating a support bracket 20 and a heating wire 30. The heating wire 30 is evenly wound on the support bracket 20 the support bracket 20 is sleeved in the accommodation space 15, and a shape of the support bracket 20 matches a spatial shape of the accommodation space 15. It can be seen from FIG. 2 that the heating wire 30 is evenly distributed between an inner wall of the housing 10 and an outer wall of the support bracket 20. One end of the heating wire 30 extends from the outside of the support bracket 20, and the other end of the heating wire 30 extends from the interior of the support bracket 20, avoiding a problem of short circuit between heating wires and improving safety and reliability of the heating element.

Preferably, the housing 10 is made of a food-grade ceramic material with an integrally formed structure, completely solving a problem of separation of the housing and the base in a heating process of the heating wire in the case of a conventional structure of separating the housing and the base, and further improving safety and reliability of the heating element.

Preferably, the ceramic heating element further includes a temperature control component 40, and the temperature control component 40 is a K-type thermocouple or a TCR temperature control module. One end of the K-type thermocouple penetrates through a through hole arranged in the support bracket 20, and the other end of the K-type thermocouple extends through a groove arranged on the outer wall of the support bracket along a length direction of the support bracket 20. To ensure reliability of overall temperature detection of the heating element, compared with a conventional temperature detection thermocouple, the K-type thermocouple and the TCR temperature control module can effectively avoid a problem of inaccurate temperature detection of the temperature control component 40 due to a temperature rise, thereby enhancing reliability of the heating element.

It should be noted that the number of through holes in the support bracket 20 and the number of external grooves of the support bracket 20 are not limited in the present disclosure, and may be increased or decreased based on a specific usage situation during actual use. A position of a lead-out wire of the heating wire and a position of a lead-out wire of the temperature control component are not limited in the present disclosure either, and may be adjusted as required without affecting the use.

Figure 4:
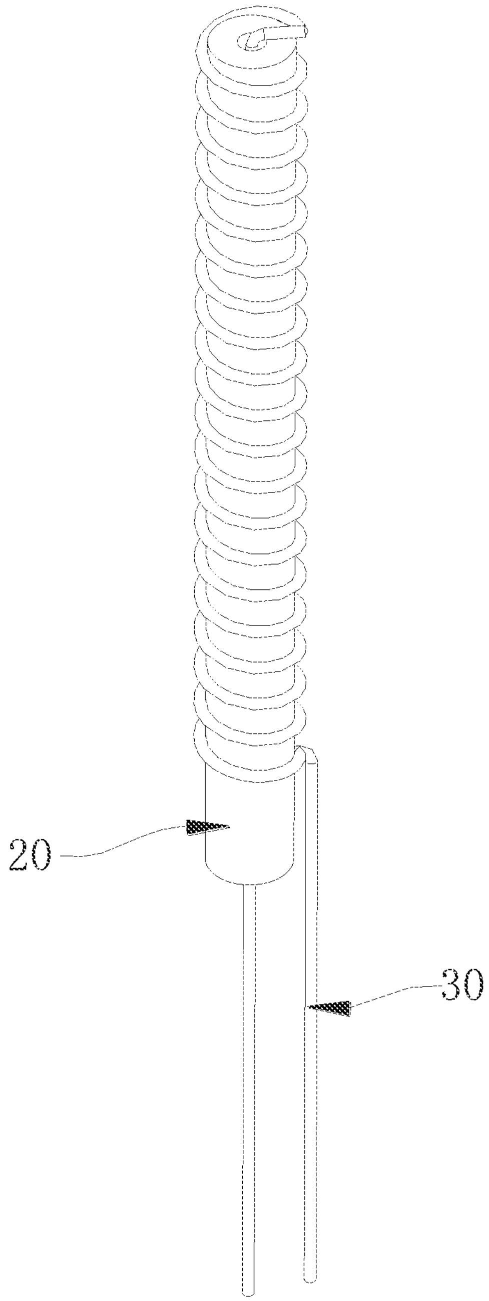
FIG. 4 is a schematic diagram of a support bracket and a heating wire according to an implementation of the present disclosure.

FIG. 4 is a schematic diagram of a support bracket and a heating wire according to an implementation of the present disclosure. Referring to FIG. 4, the support bracket 20 is a hollow cylinder as a whole, one end of the heating wire 30 penetrates through a hollow structure 31 inside the support bracket 20, and the other end of the heating wire 30 is evenly distributed in a spiral shape along the outer wall of the support bracket 20. This winding method ensures uniformity of heating on one hand, and effectively avoids a problem of short circuit between heating wires and improves safety and reliability of the heating element on the other hand.

Preferably, the support bracket 20 is made of a food-grade ceramic material with an integrally formed structure, featuring good uniformity, easy installation, reduced production costs, and good insulation performance.

Embodiment 2

Figure 5:
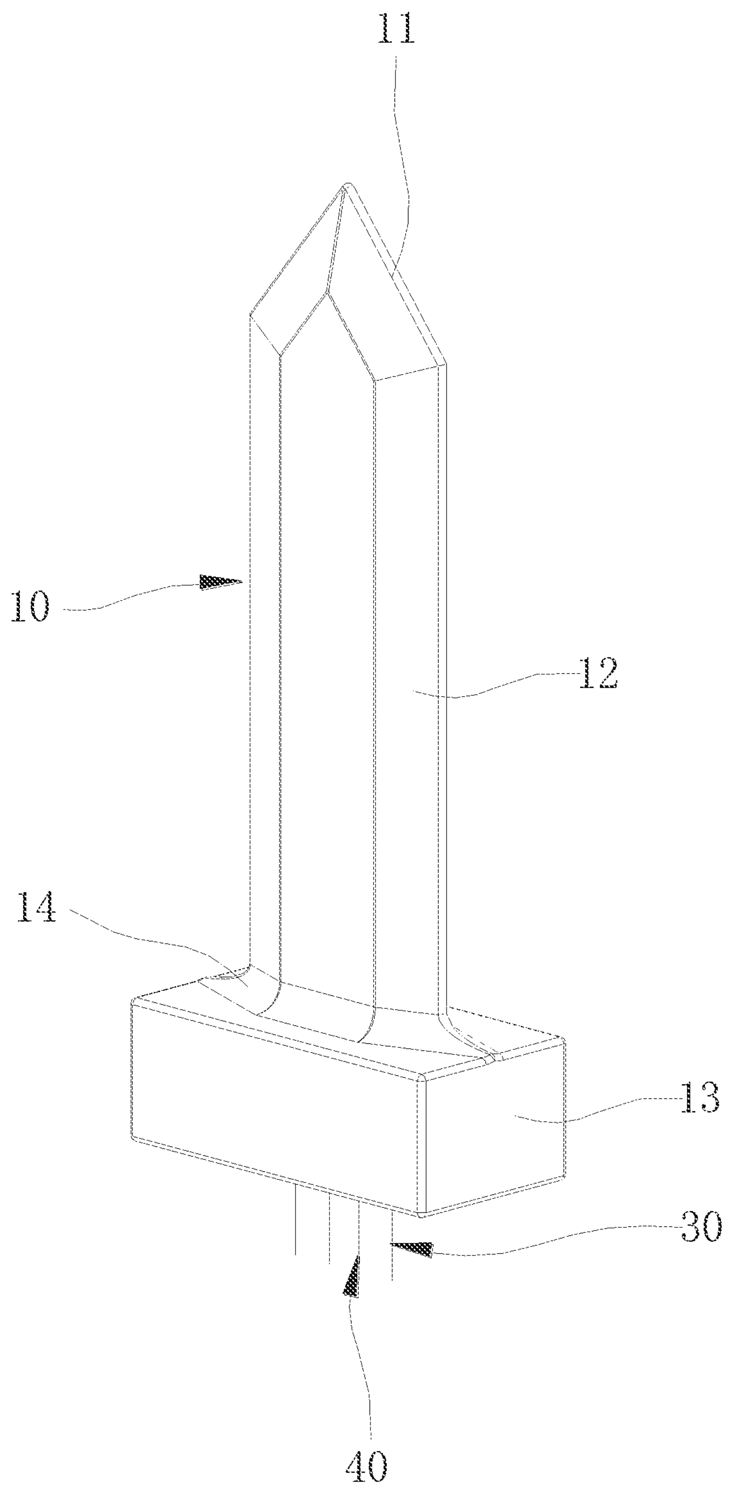
FIG. 5 is a schematic diagram of a heating element according a second implementation of to the present invention disclosure.

FIG. 5 is a schematic diagram of a heating element according to a second implementation of the present disclosure. Referring to FIG. 5, the heating element includes a sword-shaped housing 10, where one end of the housing 10 is provided with a blade tip 11, and a periphery of the housing 10 is further provided with a sharp edge 12, facilitating insertion of the heating element into a product such as an electronic cigarette to heat the product; an open end of the housing 10 is provided with a base 13, and an arc transition structure 14 is arranged at a junction between the base 13 and a main structure of the housing 10, to enhance strength of the root of the housing 10, and ensure a service life of the heating element.

Preferably, the housing 10 is made of a food-grade ceramic material with an integrally formed structure, and thus has good uniformity and good insulation performance. Compared with a conventional structure of separating the housing and the base, the housing 10 features easy processing, high reliability, and low mass production costs.

A support bracket (not shown in the figure), a heating wire 30 wound on the support bracket, and a K-type thermocouple 40 are arranged inside the housing 10.

The present disclosure further provides an electronic cigarette, including any heating element described above.

It can be learned from the above description that, in the present disclosure, the arrangement of the integrally formed flat or needle-shaped ceramic housing, the support bracket sleeved in the heating element, the heating wire evenly wound on the support bracket, and the temperature control component installed on the support bracket forms a heating element that has a simple structure and good insulation performance, heats up evenly, and is easy to use, and forms an electronic cigarette using the heating element.

Although the present disclosure is specifically shown and described with reference to preferred embodiments, a person skilled in the art should understand that various changes, which can be made to the present disclosure in form and detail without departing from the gist and scope of the present disclosure defined by the claims, fall within the protection scope of the present disclosure.

What is claimed is:

1. A ceramic heating element, comprising: a flat or needle-shaped ceramic housing, a support bracket sleeved in the ceramic housing, and a heating wire evenly wound on the support bracket, an interior of the support bracket being a hollow structure;

wherein one end of the heating wire penetrates through the hollow structure of the support bracket, and the other end of the heating wire is distributed in a spiral shape along an outer wall of the support bracket.

2. The ceramic heating element of claim 1, wherein the ceramic heating element is in a hollow cylinder shape or a flat shape, and has an integrally formed structure.

3. The ceramic heating element of claim 2, wherein the support bracket is made of a ceramic material.

4. The ceramic heating element of claim 1, wherein an open end of the housing is provided with a rectangular or cylindrical base, and an arc transition structure is arranged at a junction between the base and a main structure of the housing.

5. The ceramic heating element of claim 1, further comprising a temperature control component, wherein the temperature control component is a K-type thermocouple or a TCR temperature control module.

6. The ceramic heating element of claim 5, wherein one end of the K-type thermocouple penetrates through the interior of the support bracket, and the other end of the K-type thermocouple extends along an outer wall of the support bracket.

7. The ceramic heating element of claim 6, wherein the outer wall of the support bracket is provided with at least one groove extending along a length direction of the support bracket, and the groove is capable of being configured to place the K-type thermocouple and/or the heating wire.

8. The ceramic heating element of claim 1, wherein the ceramic housing is an integrally formed structure, and is sword-shaped as a whole, an end part of the ceramic housing is provided with a blade tip and/or a peripheral edge of the ceramic housing is provided with a sharp edge.

9. An electronic cigarette, comprising a ceramic heating element comprising: a flat or needle-shaped ceramic housing, a support bracket sleeved in the ceramic housing, and a heating wire evenly wound on the support bracket, an interior of the support bracket being a hollow structure;

wherein one end of the heating wire penetrates through the hollow structure of the support bracket, and the other end of the heating wire is distributed in a spiral shape along an outer wall of the support bracket.

10. The electronic cigarette of claim 9, wherein the ceramic heating element is in a hollow cylinder shape or a flat shape, and has an integrally formed structure.

11. The electronic cigarette of claim 10, wherein the support bracket is made of a ceramic material.

12. The electronic cigarette of claim 9, wherein an open end of the housing is provided with a rectangular or cylindrical base, and an arc transition structure is arranged at a junction between the base and a main structure of the housing.

13. The electronic cigarette of claim 9, wherein the ceramic heating element further comprises a temperature control component, wherein the temperature control component is a K-type thermocouple or a TCR temperature control module.

14. The electronic cigarette of claim 13, wherein one end of the K-type thermocouple penetrates through the interior of the support bracket, and the other end of the K-type thermocouple extends along an outer wall of the support bracket.

15. The electronic cigarette of claim 14, wherein the outer wall of the support bracket is provided with at least one groove extending along a length direction of the support bracket, and the groove is capable of being configured to place the K-type thermocouple and/or the heating wire.

16. The electronic cigarette of claim 9, wherein the ceramic housing is an integrally formed structure, and is sword-shaped as a whole, an end part of the ceramic housing is provided with a blade tip and/or a peripheral edge of the ceramic housing is provided with a sharp edge.

* * * * *